US012809210B2

(12) United States Patent
Lo et al.

(10) Patent No.: US 12,809,210 B2
(45) Date of Patent: Nov. 24, 2026

(54) DECORATION DEVICE

(71) Applicant: CARUX TECHNOLOGY PTE. LTD., Singapore (SG)

(72) Inventors: Ching-I Lo, Tainan (TW); Ta-Chin Huang, Tainan (TW); Hung-Ching Lee, Tainan (TW); Ming-Cheng Hsieh, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 220 days.

(21) Appl. No.: 18/733,835

(22) Filed: Jun. 4, 2024

(65) Prior Publication Data

US 2025/0013099 A1 Jan. 9, 2025

(30) Foreign Application Priority Data

Jul. 5, 2023 (CN) ......................... 202310819150.4

(51) Int. Cl.

*G02F 1/13357* (2006.01)
*B44F 9/02* (2006.01)
*G02F 1/13* (2006.01)
*G02F 1/1333* (2006.01)
*G02F 1/1335* (2006.01)

(52) U.S. Cl.

CPC .......... *G02F 1/133603* (2013.01); *B44F 9/02* (2013.01); *G02F 1/1323* (2013.01); *G02F 1/13338* (2013.01); *G02F 1/133512* (2013.01); *B60K 2360/339* (2024.01); *B60K 2360/693* (2024.01)

(58) Field of Classification Search

None

See application file for complete search history.

(56) References Cited

U.S. PATENT DOCUMENTS

| | | | | |
|---|---|---|---|---|
| 2019/0063722 | A1* | 2/2019 | Sugiyama | B32B 27/302 |
| 2020/0369223 | A1* | 11/2020 | Hansen | B60K 35/10 |
| 2021/0063783 | A1* | 3/2021 | Byoun | B60K 35/654 |
| 2023/0415670 | A1* | 12/2023 | Da Silva | B60R 11/0229 |

FOREIGN PATENT DOCUMENTS

| | | |
|---|---|---|
| CN | 107719228 | 6/2021 |
| TW | I504334 | 10/2015 |

* cited by examiner

*Primary Examiner* — Phu Vu

(74) *Attorney, Agent, or Firm* — JCIPRNET

(57) ABSTRACT

A decoration device, including a first region and a second region disposed adjacent to the first region, is provided. The decoration device includes a display, a light emitting module, and a decoration film. The display is disposed corresponding to the first region and is used to display a variable image. The light emitting module is disposed in the second region and is used to emit a light beam to present a fixed pattern. The decoration film is disposed at least corresponding to the second region. The decoration device displays a decoration film surface in a first state, and the decoration device displays the variable image and the fixed pattern in a second state.

19 Claims, 12 Drawing Sheets

DECORATION DEVICE

CROSS-REFERENCE TO RELATED APPLICATION

This application claims the priority benefit of China application serial no. 202310819150.4, filed on Jul. 5, 2023. The entirety of the above-mentioned patent application is hereby incorporated by reference herein and made a part of this specification.

BACKGROUND

Technical Field

The disclosure relates to an electronic device, and in particular to a decoration device.

Description of Related Art

Conventional electronic devices mainly use physical buttons or touch panels to provide touch functions. Although the use of physical buttons is convenient for operation, the physical buttons take up a lot of space and tend to appear cluttered. Although the design of integrating the touch panel and the display panel helps to save space, the display screen may be cluttered when displaying a touch image or the original image being played must be interrupted to display the touch image.

SUMMARY

The disclosure provides a decoration device, which helps to improve screen clutter.

According to an embodiment of the disclosure, a decoration device includes a first region and a second region disposed adjacent to the first region. The decoration device includes a display, a light emitting module, and a decoration film. The display is disposed corresponding to the first region and is used to display a variable image. The light emitting module is disposed in the second region and is used to emit a light beam to present a fixed pattern. The decoration film is disposed at least corresponding to the second region. The decoration device displays a decoration film surface in a first state, and the decoration device displays the variable image and the fixed pattern in a second state.

In order for the features and advantages of the disclosure to be more comprehensible, the following specific embodiments are described in detail in conjunction with the drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
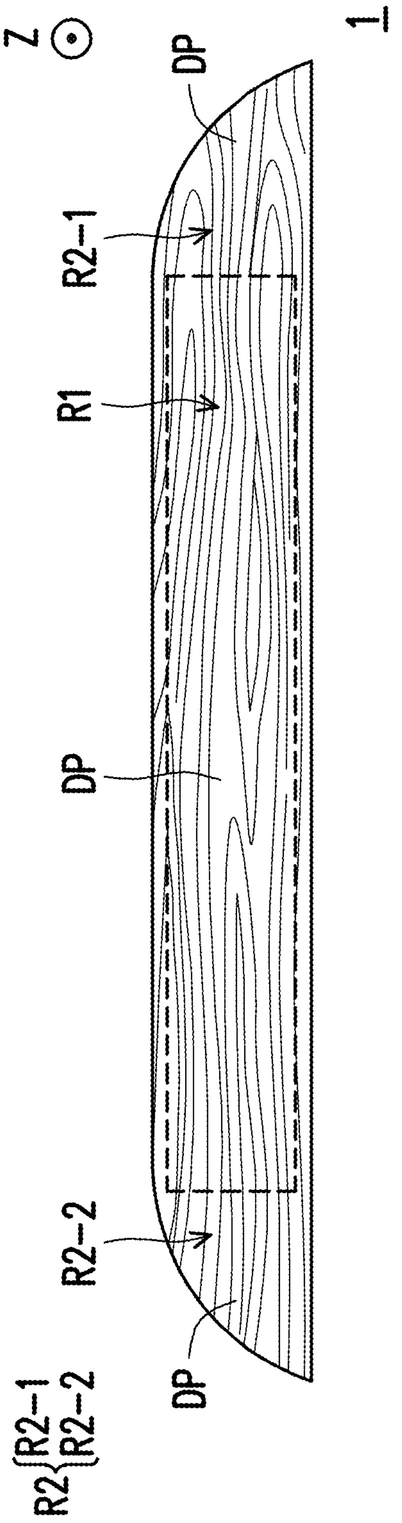
FIG. 1A to FIG. 1C are respectively top schematic views of a decoration device in a first state, a second state, and a third state according to an embodiment of the disclosure.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

Throughout the specification and the appended claims of the disclosure, certain terms may be used to refer to specific elements. It should be understood by persons skilled in the art that electronic device manufacturers may refer to the same element by different names. The disclosure does not intend to distinguish between elements with the same function but different names. In the following specification and claims, words such as "containing" and "comprising" are open-ended words, so the words should be interpreted as "including but not limited thereto . . . ".

Directional terms such as "upper", "lower", "front", "rear", "left", and "right" mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

When a structure (or layer, element, substrate) is described in the disclosure as being located on/above another structure (or layer, element, substrate), it may mean that the two structures are adjacent and directly connected or it may mean that the two structures are adjacent but not directly connected. Indirect connection means that there is at least one intermediate structure (or intermediate layer, intermediate element, intermediate substrate, intermediate spacing) between the two structures. A lower surface of one structure is adjacent or directly connected to an upper surface of the intermediate structure, and an upper surface of the other structure is adjacent or directly connected to a lower surface of the intermediate structure. The intermediate structure may be composed of a single-layer or multi-layer physical structure or non-physical structure, which is not limited. In the disclosure, when a certain structure is disposed "on" another structure, it may mean that the certain structure is "directly" on the other structure or it may mean that the certain structure is "indirectly" on the other structure, that is, at least one structure is also sandwiched between the certain structure and the other structure.

The terms "about", "substantially", or "roughly" are generally interpreted as within 10% of a given value or range, or interpreted as within 5%, 3%, 2%, 1%, or 0.5% of the given value or range. In addition, the terms "a range is from a first value to a second value" and "the range is between the first value and the second value" mean that the range includes the first value, the second value, and other values therebetween.

Ordinal numbers such as "first" and "second" used in the specification and the claims are used to modify elements and do not imply and represent that the elements have any previous ordinal numbers, nor do they represent the order of a certain element and another element or the order of a manufacturing method. The use of the ordinal numbers is only used to clearly distinguish between an element with a certain name and another element with the same name. The claims and the description may not use the same terms, whereby a first component in the specification may be a second component in the claims.

Electrical connection or coupling described in the disclosure may refer to direct connection or indirect connection. In the case of direct connection, terminals of elements on two circuits are directly connected or connected to each other by a conductor segment. In the case of indirect connection, there is a switch, a diode, a capacitor, an inductor, a resistor, other suitable elements, or a combination of the above elements between the terminals of the elements on the two circuits, but not limited thereto.

In the disclosure, the measurement manner of thickness, length, and width may be by adopting an optical microscope (OM), and thickness or width may be measured by a cross-sectional image in an electron microscope, but not limited thereto. In addition, there may be a certain error in any two values or directions for comparison. In addition, if a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

Unless otherwise defined, all terms (including technical and scientific terms) used herein have the same meaning as commonly understood by persons skilled in the art to which the disclosure belongs. It can be understood that the terms such as the terms defined in commonly used dictionaries should be interpreted as having meanings consistent with the relevant art and the background or context of the disclosure, and should not be interpreted in an idealized or overly formal manner, unless particularly defined in the embodiments of the disclosure.

In the disclosure, an electronic device may include a display device, a backlight device, an antenna device, a sensing device, or a splicing device, but not limited thereto. The electronic device may be a bendable or flexible electronic device. The display device may be a non-self-luminous display device or a self-luminous display device. The display device may, for example, include liquid crystal, a light emitting diode, fluorescence, phosphor, quantum dot (QD), other suitable display media, or a combination of the above. The antenna device may, for example, include a frequency selective surface (FSS), a radio frequency filter (RF-Filter), a polarizer, a resonator, an antenna, etc. The antenna may be a liquid crystal type antenna or a non-liquid crystal type antenna. The sensing device may be a sensing device for sensing capacitance, light, heat, or ultrasound, but not limited thereto. In the disclosure, the electronic device may include electronic elements. The electronic elements may include passive elements and active elements, such as a capacitor, a resistor, an inductor, a diode, and a transistor. The diode may include a light emitting diode or a photodiode. The light emitting diode may, for example, include an organic light emitting diode (OLED), a mini LED, a micro LED, or a quantum dot LED, but not limited thereto. The splicing device may, for example, be a display splicing device or an antenna splicing device, but not limited thereto. It should be noted that the electronic device may be any permutation and combination of the above, but not limited thereto. In addition, the appearance of the electronic device may be rectangular, circular, polygonal, a shape having curved edges, or other suitable shapes. The electronic device may have peripheral systems such as a driving system, a control system, and a light source system to support the display device, the antenna device, a wearable device (such as including augmented reality or virtual reality), a vehicle device (such as including a car windshield), or the splicing device.

It should be noted that in the following embodiments, the features in several different embodiments may be replaced, recombined, and mixed to complete other embodiments without departing from the spirit of the disclosure. As long as the features of the embodiments do not violate the spirit of the invention or conflict with each other, the features may be arbitrarily mixed and matched for use.

Figure 1B:
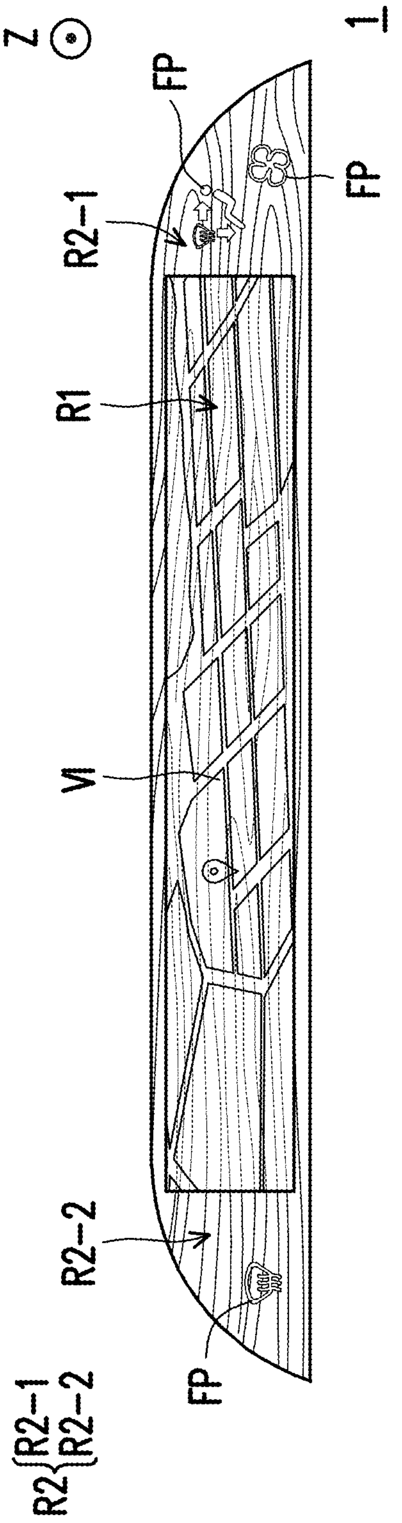
Figure 1C:
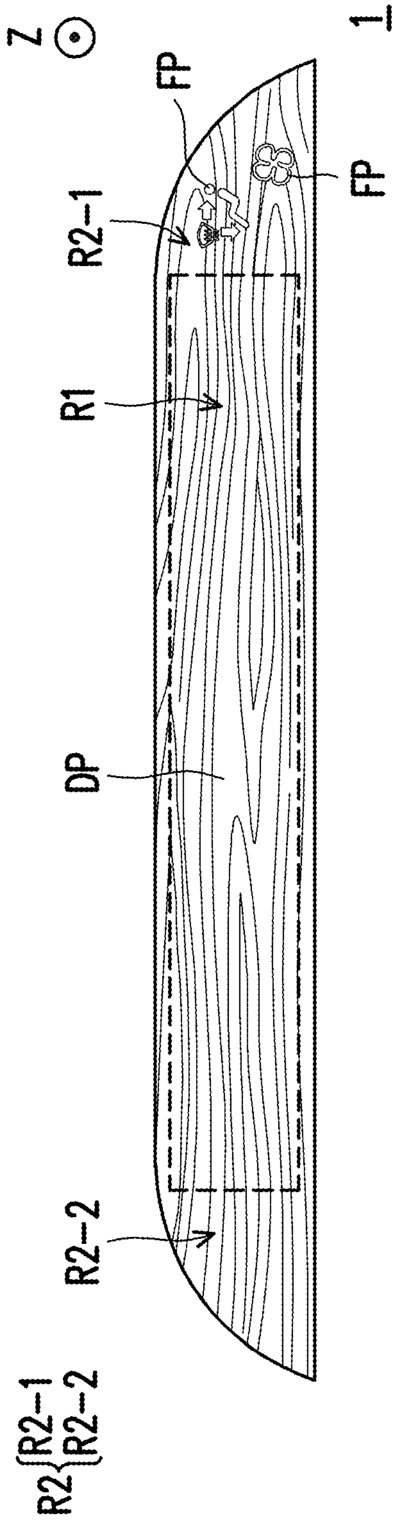

FIG. 1A to FIG. 1C are respectively top schematic views of a decoration device 1 in a first state, a second state, and a third state according to an embodiment of the disclosure. Please refer to FIG. 1A to FIG. 1C. The states of the decoration device 1 may be, for example, electronically switched to provide a display function, a decoration function, a touch function, other functions, or a combination of the above functions. Electronically switching the states may include providing a voltage, a voltage difference, or a current to electronic elements in the decoration device 1, so as to control the states of the electronic elements, such as controlling whether the light emitting element emits light, controlling the light intensity of the light beam emitted by the light emitting element, controlling the gray scale of a pixel, and controlling the transparency of a viewing angle switching unit, but not limited thereto.

The display function may include displaying at least one of a variable image and a fixed pattern. The fixed pattern refers to a pattern or a text whose size, position, shape, and other parameters are fixed, and the variable image refers to a pattern or a text on an image screen whose at least one of the size, position, shape, and other parameters is variable or adjustable. Taking the vehicle device as an example, as shown in FIG. 1B, a variable image VI may be a dynamic map, and a fixed pattern FP may be a vehicle-related pattern, such as an exhaust fan pattern and an air-conditioning direction pattern, but not limited thereto. The decoration function may include at least one of senses such as sight (for example, color, pattern, transparency, etc.) and touch (for example, unevenness, roughness, etc.). The touch function may include at least one of a floating touch function and a physical touch function.

Through electronically switching the state of the decoration device 1, the decoration device 1 may provide different visual and/or tactile stimuli for the user. For example, as shown in FIG. 1A, the decoration device 1 may display a decoration film surface (for example, a decoration pattern DP) in the first state; as shown in FIG. 1B, the decoration device 1 may display the variable image VI and the fixed pattern FP in the second state; and as shown in FIG. 1C, the decoration device 1 may display the decoration film surface (for example, the decoration pattern DP) and the fixed pattern FP in the third state, but not limited thereto.

In detail, the decoration device 1 may include a first region R1 and a second region R2 disposed adjacent to the first region R1. In some embodiments, the second region R2 is disposed on one or more sides of the first region R1. In some embodiments, the second region R2 surrounds the first region R1. In some embodiments, the second region R2 is a region other than the first region R1. In some embodiments, there is no obvious boundary between the first region R1 and the second region R2 (the boundary between the first region R1 and the second region R2 is shown by dotted lines in FIG. 1A and FIG. 1C in order to distinguish between the first region R1 and the second region R2), but not limited thereto.

In different states, the first region R1 and the second region R2 may provide the same or different visual effects and/or different tactile effects. For example, as shown in FIG. 1A, when the decoration device 1 is in the first state, the first region R1 and the second region R2 may provide the same visual and/or tactile effects, such as both presenting the decoration pattern DP (for example, leather texture, wood grain texture, metallic texture, leopard prints, or other patterns) and/or the touch of the decoration pattern DP.

As shown in FIG. 1B, when the decoration device 1 is in the second state, the first region R1 and the second region R2 may provide different visual effects and/or different tactile effects. For example, when the decoration device 1 is in the second state, the first region R1 may provide the variable image VI, and the second region R2 may provide the fixed pattern FP. In some embodiments, when the decoration device 1 is in the second state, the second region R2 may further provide tactile feedback. For example, when the fixed pattern FP in the second region R2 lights up and a finger is pressed on any fixed pattern FP in the second region R2, the second region R2 may generate a corresponding vibration.

As shown in FIG. 1C, when the decoration device 1 is in the third state, the first region R1 and the second region R2 may provide different visual effects and/or different tactile effects. For example, when the decoration device 1 is in the third state, the first region R1 may present the decoration pattern DP and/or the touch of the decoration pattern DP, and the second region R2 may provide the fixed pattern FP. In some embodiments, when the decoration device 1 is in the third state, the second region R2 may further provide tactile feedback. For example, when the fixed pattern FP in the second region R2 lights up and a finger is pressed on any fixed pattern FP in the second region R2, the second region R2 may generate a corresponding vibration.

In some embodiments, the second region R2 may include multiple regions. For example, the second region R2 may include a region R2-1 located on the right of the first region R1 and a region R2-2 located on the left of the first region R1, but not limited thereto. The regions (including the region R2-1 and the region R2-2) in the second region R2 may provide different types of fixed patterns FP. In some embodiments, different regions (for example, the region R2-1 and the region R2-2) in the second region R2 may be independently controlled. For example, light emitting elements (not shown in FIG. 1B and FIG. 1C; to be described later) located in the region R2-1 and the region R2-2 may be independently lit, that is, when the fixed pattern FP in the region R2-1 lights up, the fixed pattern FP in the region R2-2 may be dimmed (as shown in FIG. 1C) or lit (as shown in FIG. 1B); and when the fixed pattern FP in the region R2-2 lights up, the fixed pattern FP in the region R2-1 may be dimmed (not shown) or lit (as shown in FIG. 1B).

Figure 2:
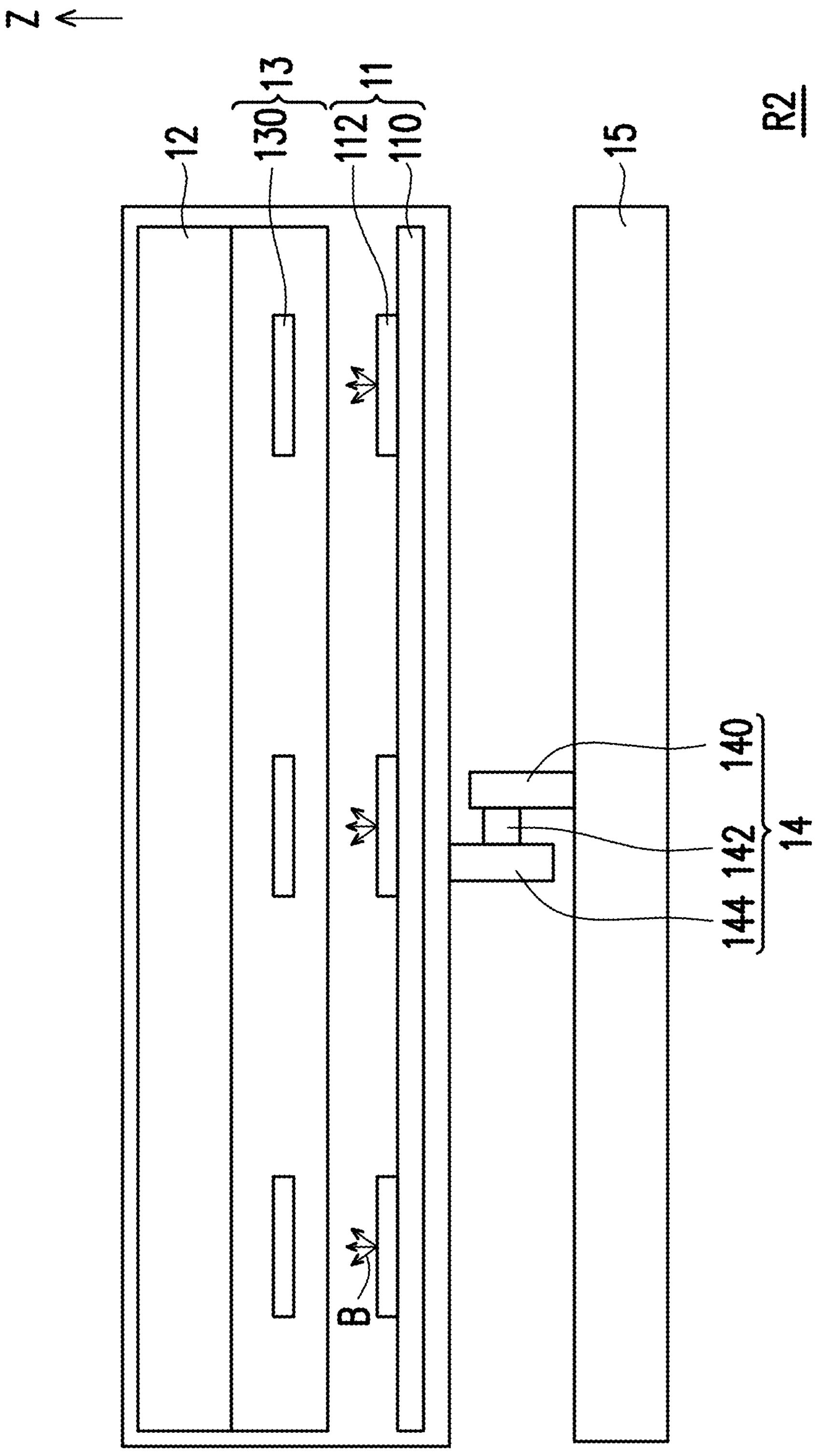
FIG. 2 is a partial cross-sectional schematic view of a second region of the decoration device of FIG. 1.
Figure 3:
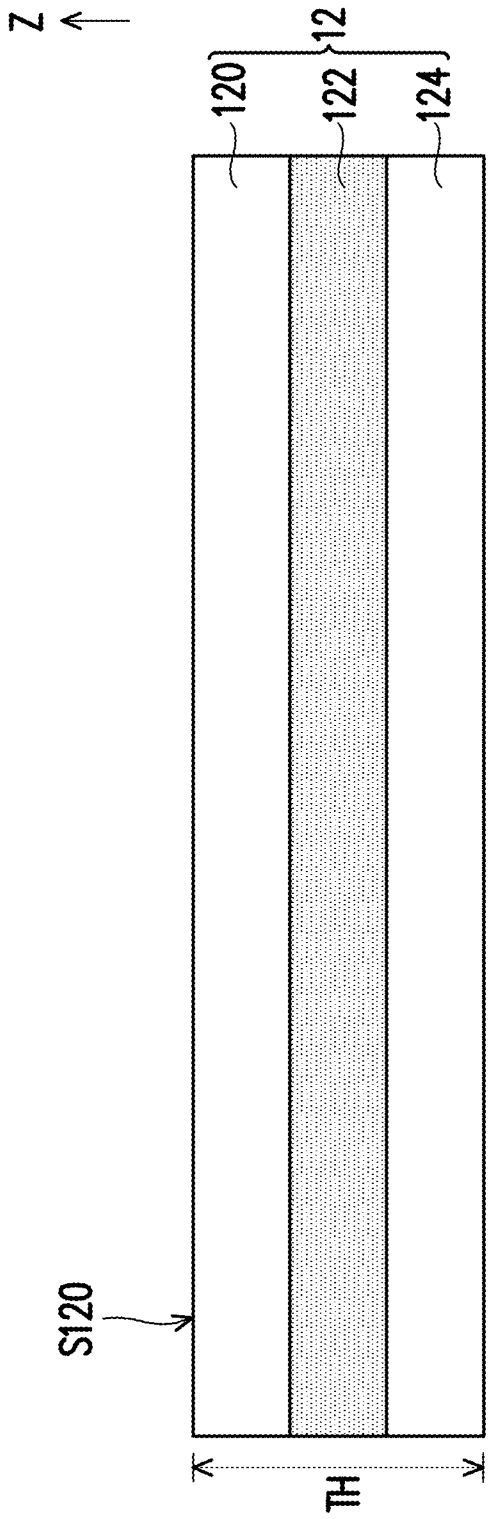
FIG. 3 is a partially enlarged schematic view of a decoration film of FIG. 2.
Figure 4:
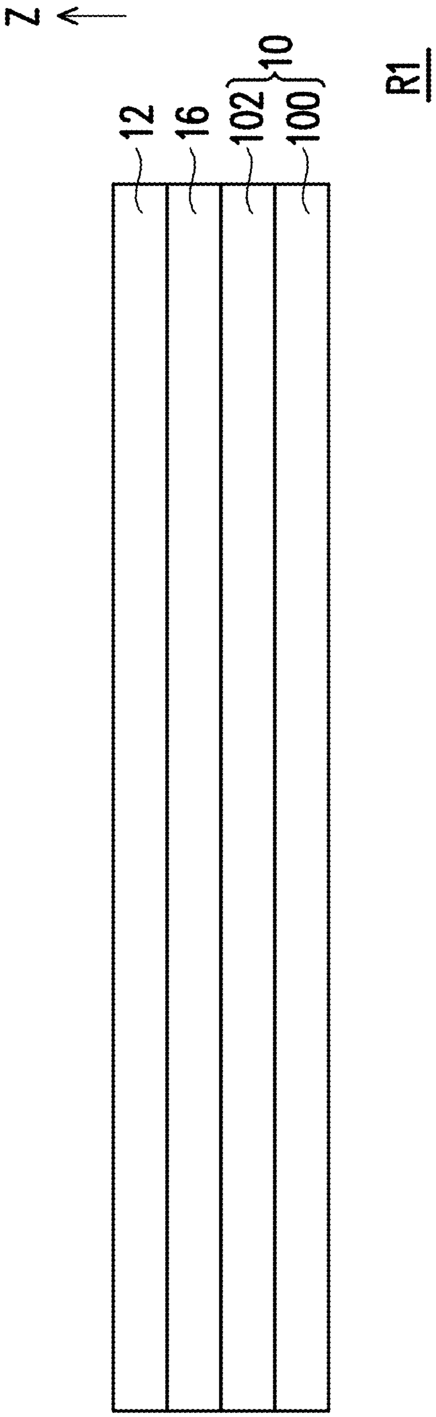
FIG. 4 to FIG. 6 are respectively three partial cross-sectional schematic views of a first region of the decoration device of FIG. 1.
Figure 5:
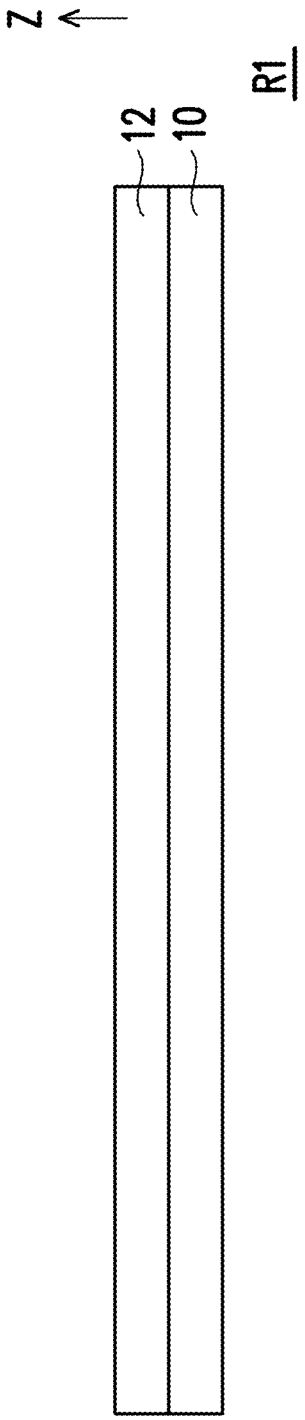
Figure 6:
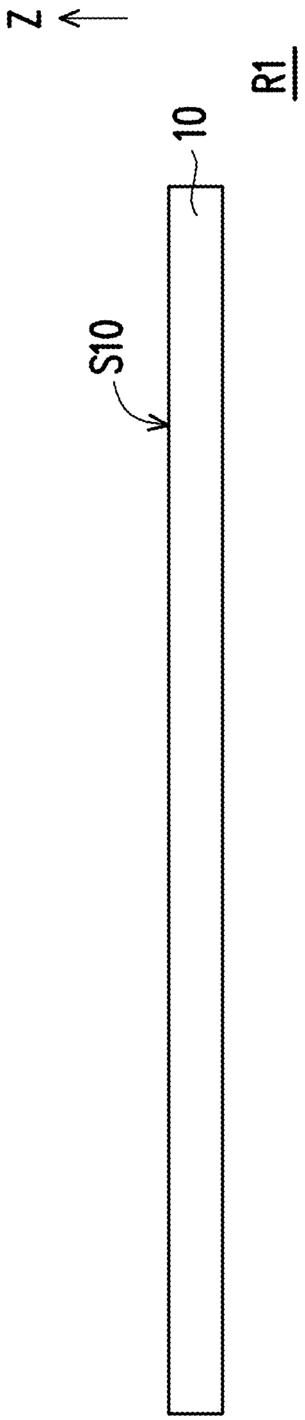

FIG. 2 is a partial cross-sectional schematic view of the second region R2 of the decoration device 1 of FIG. 1. For example, FIG. 2 may be a partial cross-sectional schematic view of the region R2-1 or the region R2-2 in FIG. 1. FIG. 3 is a partially enlarged schematic view of a decoration film 12 of FIG. 2. FIG. 4 to FIG. 6 are respectively three partial cross-sectional schematic views of the first region R1 of the decoration device 1 of FIG. 1.

Please refer to FIG. 2 to FIG. 4. The decoration device 1 may include a display 10, a light emitting module 11, and the decoration film 12. The display 10 is disposed corresponding to the first region R1 and may be used to display the variable image VI (as shown in FIG. 1B). For example, the display 10 may be a non-self-luminous display or a self-luminous display. Taking the non-self-luminous display as an example, as shown in FIG. 4, the display 10 may include a backlight module 100 and a non-self-luminous display panel 102. The backlight module 100 may be a direct type backlight module or a side type backlight module, and there is no limitation here. The non-self-luminous display panel 102 is disposed on a light emitting side of the backlight module 100 and may be a liquid crystal display panel, but not limited thereto. Taking the self-luminous display as an example, although not shown in FIG. 4, the display 10 may include multiple light emitting elements for providing display beams (not shown; light beams carrying display information). The light emitting element may include an organic light emitting diode, a mini light emitting diode, a micro light emitting diode, or a quantum dot light emitting diode, but not limited thereto. Although not shown in FIG. 4, the display 10 may include an active region (a region that provides the variable image VI; for example, a region where a pixel array is located) and a peripheral region adjacent to the active region (a region other than the active region and may be used to dispose a peripheral circuit). In some embodiments, the active region of the display 10 at least partially overlaps with the first region R1 of the decoration device 1 in a thickness direction (for example, a direction Z) of the decoration device 1. In some embodiments, the first region R1 of the decoration device 1 may be defined by the active region of the display 10, but not limited thereto.

The light emitting module 11 is disposed in the second region R2 and is used to emit a light beam B to present the fixed pattern FP (as shown in FIG. 1B or FIG. 1C). For example, the light emitting module 11 may include a circuit board 110 and multiple light emitting elements 112. The light emitting elements 112 are disposed on the circuit board 110 and are electrically connected to the circuit board 110. The light emitting element 112 may include a light emitting diode, but not limited thereto. The number, the configuration positions, etc. of the light emitting elements 112 in the second region R2 may be determined depending on the number of the fixed patterns FP, the size of the fixed pattern FP, the distance between the fixed patterns FP, the divergence angle of the light emitting element 112, or other design parameters. The quantitative relationship between the light emitting elements 112 and the fixed patterns FP may be one-to-one, one-to-many, or many-to-one, and there is no limitation here. In addition, according to different requirements (such as the effect to be presented by the fixed pattern FP), the light emitting elements 112 may include multiple light emitting diodes of the same color or light emitting diodes of different colors. In addition, when the decoration device 1 is in the second state or the third state, the light emitting diodes may be continuously lit or flashing to provide different visual effects. In some embodiments, the light emitting module in the second region R2 may define the fixed pattern FP through emitting the light beam B. For example, if the fixed pattern FP is circular, the light beam B may be emitted through the light emitting elements 112 arranged in a circle to define the fixed pattern FP or the light beam B may be emitted through forming the light emitting elements 122 corresponding to the circle to define the fixed pattern FP, but not limited thereto.

The decoration film 12 is disposed at least corresponding to the second region R2 and is used to provide a decoration function, such as being used to control the visual effect and/or the tactile effect presented by the decoration device 1. As shown in FIG. 2, the decoration film 12 may at least partially overlap with the second region R2 in the thickness direction (for example, the direction Z) of the decoration device 1, so that at least the second region R2 is decoration (presenting the decoration pattern DP as shown in FIG. 1A and/or the touch of the decoration pattern DP).

In some embodiments, as shown in FIG. 4, the decoration film 12 may also be disposed corresponding to the first region R1, that is, the decoration film 12 may at least partially overlap with the first region R1 in the thickness direction (for example, the direction Z) of the decoration device 1. Thus, the first region R1 is also decoration. Specifically, as shown in FIG. 1A, when the decoration device 1 is in the first state, the first region R1 and the second region R2 may both display the decoration film surface (that is, the decoration pattern DP), so that the visual and/or tactile effects of the first region R1 and the second region R2 are consistent. On the other hand, as shown in FIG. 1C, when the decoration device 1 is in the third state, the first region R1 may display the decoration film surface, and the second region R2 may display the fixed pattern FP. However, the disclosure is not limited thereto. In other embodiments, although not shown in FIG. 4, the decoration film 12 may be disposed outside the first region R1, that is, the decoration film 12 may not overlap with the first region R1 in the thickness direction (for example, the direction Z) of the decoration device. Under such structure, when the decoration device is in the first state, the second region R2 displays the decoration film surface (that is, the decoration pattern DP), and the first region R1 displays the variable image VI. The variable image VI may be an image imitating the decoration pattern DP when the decoration device is in the first state, so as to improve the consistency of the visual effects of the first region R1 and the second region R2, but not limited thereto. When the decoration device is in the second state, the first region R1 may display the variable image VI (for example, a dynamic map), and the second region R2 may display the fixed pattern FP (for example, a vehicle-related pattern). When the decoration device is in the third state, the second region R2 may display the fixed pattern FP (for example, a vehicle-related pattern), and the first region R1 may display the variable image VI (for example, an image imitating the decoration pattern DP).

In some embodiments, based on factors such as the display quality and/or the decorativeness of the variable image VI, the light transmittance of the decoration film 12 is, for example, greater than 50% and less than or equal to 100%. In some embodiments, based on factors such as the display quality and/or the decorativeness of the variable image VI, the haze of the decoration film 12 is, for example, less than 30% and greater than or equal to 0%. In some embodiments, based on factors such as lightness and thinness and/or decorativeness, a thickness TH (for example, the maximum thickness in the direction Z) of the decoration film 12 is, for example, greater than 0 mm and less than or equal to 4 mm.

In some embodiments, the decoration film 12 is an insulating film, that is, the decoration film 12 may not be conductive. In some embodiments, the decoration film 12 may be a composite insulating film. As shown in FIG. 3, the decoration film 12 may include a protective layer 120 and a pattern defining layer 122, but not limited thereto. For example, the decoration film 12 may further include a substrate 124, but not limited thereto.

The substrate 124 may be used to carry the protective layer 120 and the pattern defining layer 122. In addition, the substrate 124 may be transparent, but not limited thereto. For example, the material of the substrate 124 may include plastic, such as polycarbonate (PC), polyimide (PI), polypropylene (PP), polyethylene terephthalate (PET), other suitable flexible materials, or a combination of the above materials, but not limited thereto.

The pattern defining layer 122 is disposed between the light emitting module 11 (refer to FIG. 2) and the protective layer 120, and is, for example, located between the substrate 124 and the protective layer 120. The pattern defining layer 122 may also be used to provide the fixed pattern FP (refer to FIG. 1B or FIG. 1C) of the second region R2 in addition to providing the visual effect (for example, color, pattern, etc.) of the decoration device 1. For example, the pattern defining layer 122 may be an ink layer, a paint layer, or a coating layer to present the decoration pattern DP (as shown in FIG. 1A). In addition, the pattern defining layer 122 may have a through hole (not shown) allowing the light beam B emitted by the light emitting module 11 (refer to FIG. 2) to pass through. The shape and the size of the through hole correspond to the shape and the size of the fixed pattern FP, so that the second region R2 displays the fixed pattern FP when the light emitting module 11 (refer to FIG. 2) emits the light beam B.

The protective layer 120 is disposed on the pattern defining layer 122 and may be used to protect the pattern defining layer 122. In some embodiments, the protective layer 120 may be transparent, but not limited thereto. For example, the material of the protective layer 120 may include epoxy resin, acrylic-based resin, silicone, polyimide polymer, or a combination of the above materials, but not limited thereto. In some embodiments, the protective layer 120 may be further used to provide the tactile effect of the decoration device 1. For example, a surface S120 of the protective layer 120 away from the pattern defining layer 122 may have unevenness, roughness, etc., to provide the touch corresponding to the decoration pattern DP (as shown in FIG. 1A), such as the touch of leather texture, wood grain texture, metallic texture, leopard prints, or other patterns.

In some embodiments, although not shown, the decoration film 12 may also include a color defining layer. The color defining layer at least overlaps with the through hole of the pattern defining layer 122 in the direction Z to change the color presented by the fixed pattern FP (refer to FIG. 1B or FIG. 1C). In some embodiments, the color defining layer may be an ink layer, a paint layer, a coating layer, or a light conversion layer, and the color defining layer may be disposed between the pattern defining layer 122 and the substrate 124. In some embodiments, the color defining layer may be fully disposed on the substrate 124, and the color defining layer and the pattern defining layer 122 may jointly provide the visual effect (for example, color, pattern, etc.) of the decoration device 1. In some embodiments, the peel strength of the color defining layer and the pattern defining layer 122 may be greater than 30 N/5 cm (30 Newtons per five centimeters), but not limited thereto. In some embodiments, the temperature tolerance of the color defining layer and the pattern defining layer 122 may be −45 degrees Celsius to 90 degrees Celsius, but not limited thereto. In some embodiments, the color defining layer may be omitted, and the color presented by the fixed pattern FP may be controlled by the light emitting element 112 in the light emitting module 11 (refer to FIG. 2).

According to different requirements, the decoration device 1 may further include other elements or film layers. For example, as shown in FIG. 2, the decoration device 1 may further include a touch module 13, a tactile feedback module 14, and a back plate 15. The touch module 13 may be used to provide at least one of a floating touch function and a physical touch function. In addition, the touch module 13 may be a mutual-capacitive or self-capacitive touch module, and the touch module 13 includes multiple touch electrodes 130. FIG. 2 schematically shows that the touch electrodes 130 are respectively located above the light emitting elements 112, but it should be understood that the quantitative relationship between the light emitting elements 112 and the touch electrodes 130 may be one-to-one, one-to-many, or many-to-one, and there is no limitation here.

The tactile feedback module 14 may be used to provide a tactile feedback function, and the tactile feedback module 14 is, for example, located between the back plate 15 and the light emitting module 11. The tactile feedback module 14 may include a fixed member 140, an actuator 142, and a moving member 144, wherein the fixed member 140 is fixed on the back plate 15, the moving member 144 is fixed under the light emitting module 11, and the actuator 142 is disposed between the fixed member 140 and the moving member 144. The actuator 142 may include a piezoelectric actuator, a solenoid valve, an off-axis motor, etc., but not limited thereto.

The back plate 15 may be a rigid carrier or a flexible carrier. The material of the back plate 15 includes, for example, glass, quartz, ceramics, sapphire, plastic, metal, etc., but not limited thereto. The plastic may include polycarbonate (PC), polyimide (PI), polypropylene (PP), polyethylene terephthalate (PET), other suitable flexible materials, or a combination of the above materials, but not limited thereto.

In some embodiments, as shown in FIG. 4, the decoration device 1 may further include a viewing angle switching module 16 to switch between a wide viewing angle and a narrow viewing angle. The viewing angle switching module 16 may be any known viewing angle switching device, and there is no more limitation here. In other embodiments, the decoration device 1 may omit the viewing angle switching module 16. In some embodiments, the viewing angle switching module (not shown) may be disposed in the first region R1, and the viewing angle switching module (not shown) may be disposed between the light emitting module 11 and the decoration film 12. In other embodiments, the viewing angle switching module (not shown) is disposed between the light emitting module 11 and the touch module 13, but not limited thereto.

The first region R1 of the decoration device 1 may adopt other structures besides the structure shown in FIG. 4. As shown in FIG. 5, in some embodiments, the display 10 may be a self-luminous display and may include multiple light emitting elements (not shown) for providing display beams (not shown; light beams carrying display information). The decoration film 12 may be disposed on the display 10 to provide a visual effect and/or a tactile effect.

In other embodiments, although not shown, the display 10 may be a transparent display, and the decoration film 12 may be disposed under the display 10 to provide the visual effect. In some embodiments, a surface of the display 10 away from the decoration film 12 may provide the tactile effect through surface treatment (for example, electroplating, spraying, etching, etc.), but not limited thereto.

In some other embodiments, as shown in FIG. 6, the display 10 may be a high simulation display, that is, the required visual effect is presented through displaying an image similar to the decoration pattern DP shown in FIG. 1A. In some embodiments, a light emitting surface S10 of the display 10 may provide the tactile effect through surface treatment (for example, electroplating, spraying, etching, etc.), but not limited thereto. In other embodiments, a high-transparency decoration film (not shown) is disposed on the display 10, and the high-transparency decoration film may provide the tactile effect through surface treatment (for example, electroplating, spraying, etching, etc.), but not limited thereto.

Figure 7:
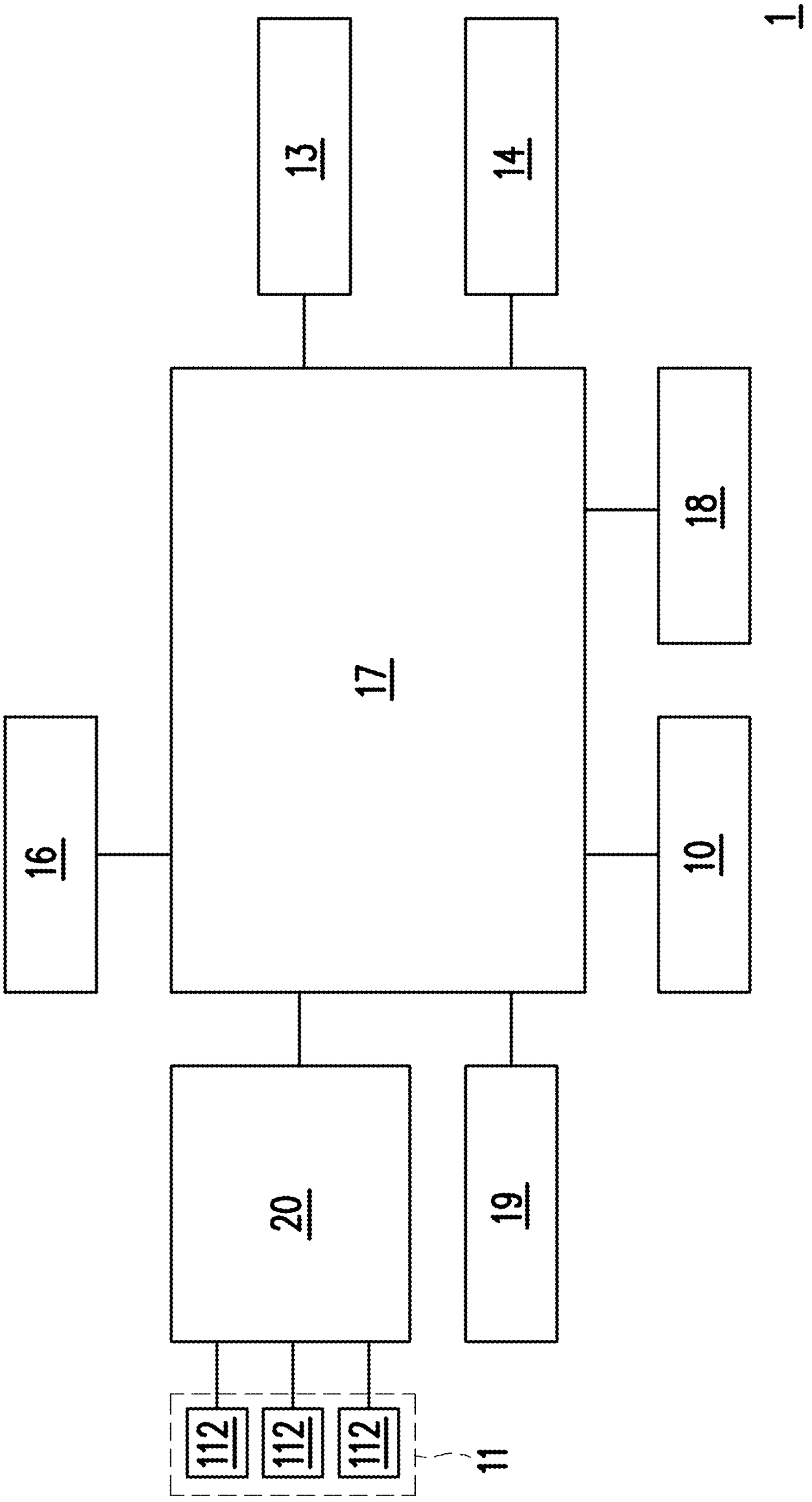
FIG. 7 is a block diagram of a decoration device according to an embodiment of the disclosure.

FIG. 7 is a block diagram of the decoration device 1 according to an embodiment of the disclosure, wherein FIG. 7 omits the decoration film 12 and the back plate 15. Please refer to FIG. 7. The decoration device 1 may further include a controller 17, a power supply 18, a detection module 19, and a local dimming unit 20, but not limited thereto. According to different requirements, one or more elements may be added or subtracted from the decoration device 1.

The controller 17 is coupled to the display 10, the touch module 13, the tactile feedback module 14, the viewing angle switching module 16 (may be omitted), the power supply 18, the detection module 19, and the local dimming unit 20. The controller 17 may include a vehicle control unit (VCU), a central processing unit (CPU), a microprocessor, an application specific integrated circuit (ASIC), a programmable logic device (PLD), other suitable control circuits, or a combination of the above, but not limited thereto.

The power supply 18 may be used to provide the electricity required for the running of the decoration device 1. For example, the power supply 18 may include a power supply line, a mobile power supply, or other charging elements or power supply elements.

The detection module 19 may at least detect the hand gesture or the line of sight of the user. In some embodiments, the detection module 19 may also be used to detect the intensity of ambient light. For example, the detection module 19 may include a camera, a visible light charge coupled device (CCD) image sensing unit, an infrared (IR) light sensing unit (for example, an IR CCD), time of flight (ToF), a structured light sensor, other suitable detection elements, or a combination of the above, but not limited thereto.

The local dimming unit 20 is coupled between the controller 17 and the light emitting module 11. The controller 17 may output a signal to the local dimming unit 20 according to the intensity of ambient light detected by the detection module 19, so that the local dimming unit 20 controls electrical signals output to the light emitting elements 112, so that the intensity of the light beams emitted by the light emitting elements 112 can be changed in response to the intensity of ambient light. Similarly, the controller 17 may output a signal to the display 10 according to the intensity of ambient light detected by the detection module 19, so as to adjust the intensity of the display beam output by the display 10.

Figure 8:
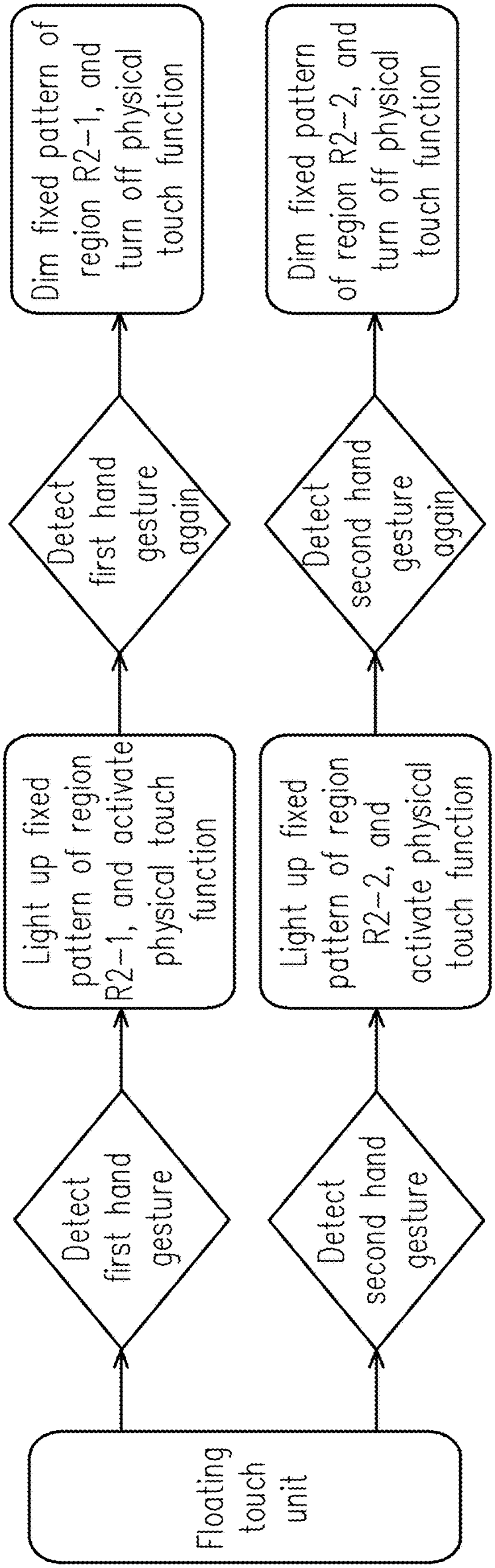
FIG. 8 to FIG. 10 are respectively three operation flowcharts of a decoration device according to the disclosure.
Figure 9:
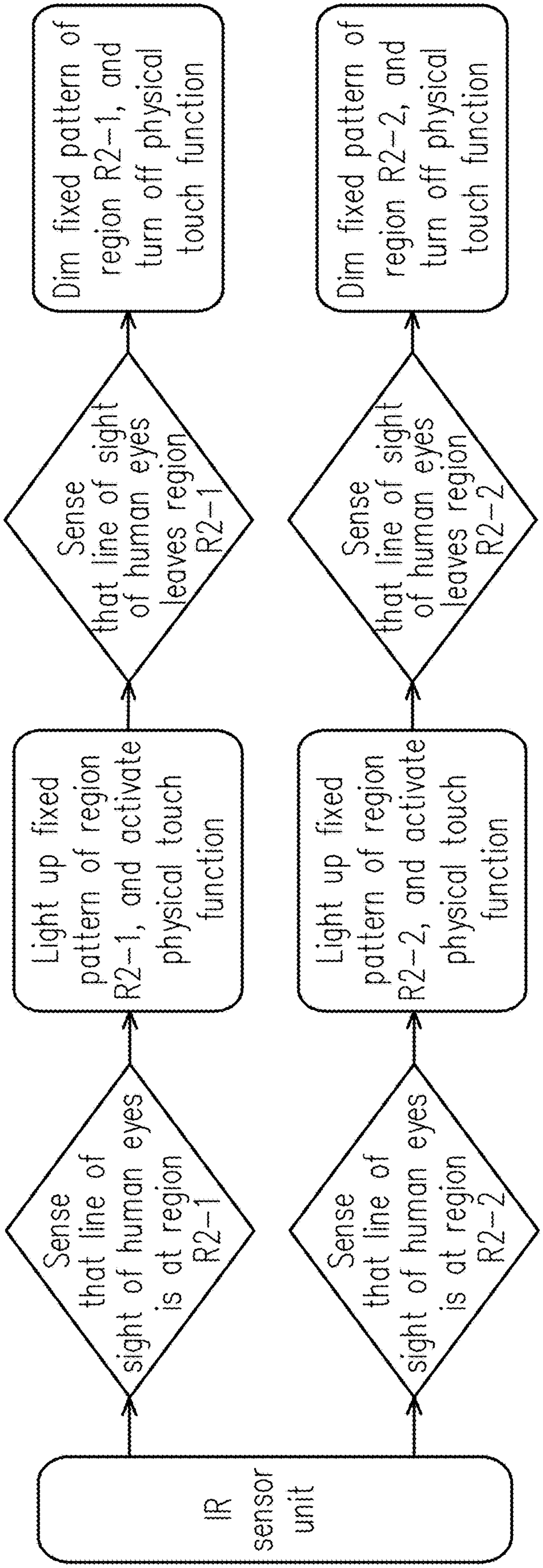
Figure 10:
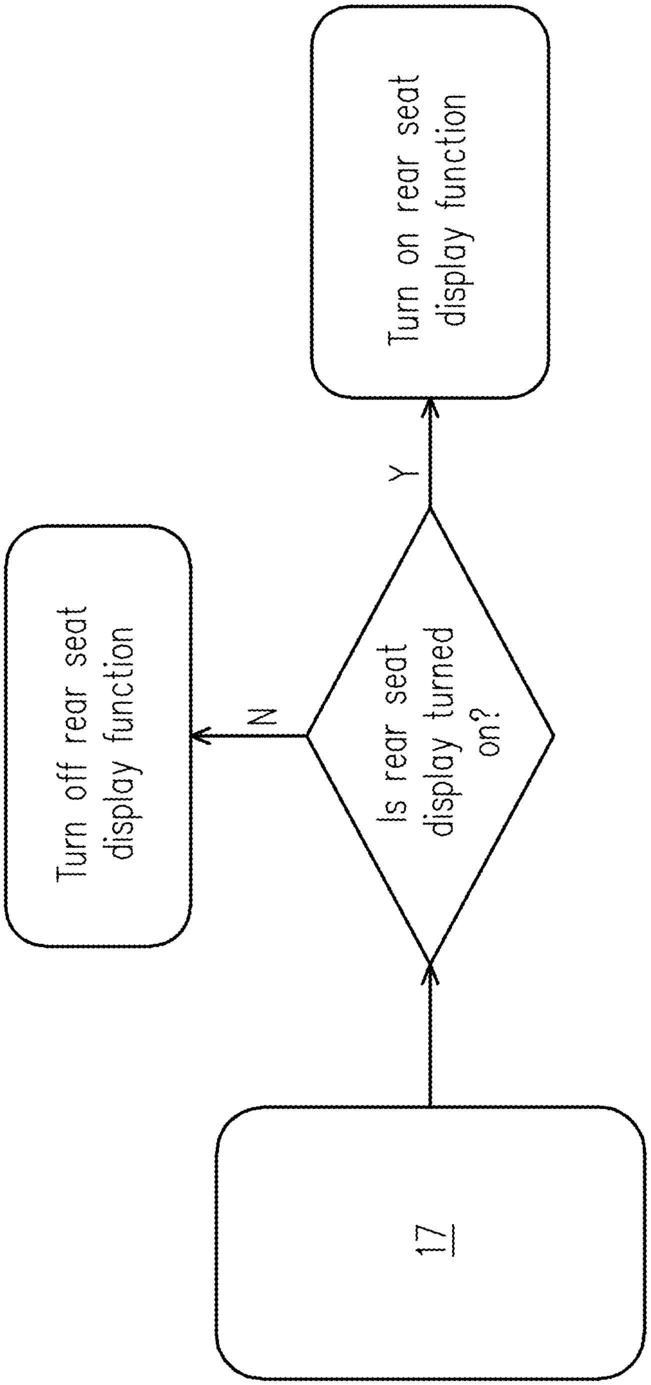

FIG. 8 to FIG. 10 are respectively three operation flowcharts of the decoration device 1 according to the disclosure. Please refer to FIG. 8 first. In some embodiments, the touch module may include a floating touch unit and a physical touch unit, and a capacitance value change between regions may be sensed through the floating touch unit to judge different hand gestures, such as waving the hand from the left to the right, waving the hand from the right to the left, and the hand staying above the region R2-1 or the region R2-2 for 2 seconds. Under such structure, the controller may be set to light up the fixed patterns FP of the region R2-1 (such as lighting up the light emitting elements 112 in the region R2-1, so that all the fixed patterns FP in the region R2-1 light up) when the floating touch unit detects a first hand gesture (such as waving the hand from the left to the right), and activate the physical touch function. At this time, the user may activate a function corresponding to the fixed pattern FP through touching the fixed pattern FP in the region R2-1, such as activating a fan function through touching a fan button in the region R2-1. In addition, the controller may be set to dim the fixed patterns FP of the region R2-1 (such as turning off the light emitting elements 112 in the region R2-1) when the floating touch unit detects the first hand gesture again, and turn off the physical touch control function, so as to reduce the possibility of touch by mistake.

Similarly, the controller may be set to light up the fixed patterns FP of the region R2-2 (such as lighting up the light emitting elements 112 in the region R2-2, so that all the fixed patterns FP in the region R2-2 light up) when the floating touch unit detects a second hand gesture (for example, waving the hand from the right to the left), and activate the physical touch function. In addition, the controller may be set to dim the fixed patterns FP of the region R2-2 (such as turning off the light emitting elements 112 in the region R2-2) when the floating touch unit detects the second hand gesture again, and turn off the physical touch control function, so as to reduce the possibility of touch by mistake.

In some other embodiments, as shown in FIG. 9, the touch module may include the physical touch unit and may control the actions of the region R2-1 and the region R2-2 through detecting the hand gesture or the line of sight of the user through the detection module. For example, the detection module may include an IR sensor unit to sense the line of sight of human eyes. The controller may be set to light up the fixed patterns FP of the region R2-1 when the IR sensor unit senses that the line of sight of the human eyes is at the region R2-1, and activate the physical touch function. In addition, the controller may be set to dim the fixed patterns FP of the region R2-1 when the IR sensor unit senses that the line of sight of the human eyes leaves the region R2-1, and turn off the physical touch function, so as to reduce the possibility of touch by mistake.

Similarly, the controller may be set to light up the fixed patterns FP of the region R2-2 when the IR sensor unit senses that the line of sight of the human eyes is at the region R2-2, and activate the physical touch function. In addition, the controller may be set to dim the fixed patterns FP of the region R2-2 when the IR sensor unit senses that the line of sight of the human eyes leaves the region R2-2, and turn off the physical touch function, so as to reduce the possibility of touch by mistake.

In some other embodiments, as shown in FIG. 10, the fixed patterns of the second region may also include a pattern for indicating turning on/off of a rear seat display, the controller may be set to turn on the rear seat display when the user presses the pattern, and the controller may be set to turn off the rear seat display when the user presses the pattern again, but not limited thereto. In some embodiments, the fixed patterns may include a first pattern for indicating turning on the rear seat display and a second pattern for indicating turning off the rear seat display. In some embodiments, the controller may turn on some functions (for example, the display function) of the rear seat display and turn off some other functions (for example, the touch function) of the rear seat display, so as to reduce safety issues caused by rear seat passengers touching buttons by mistake.

Figure 11A:
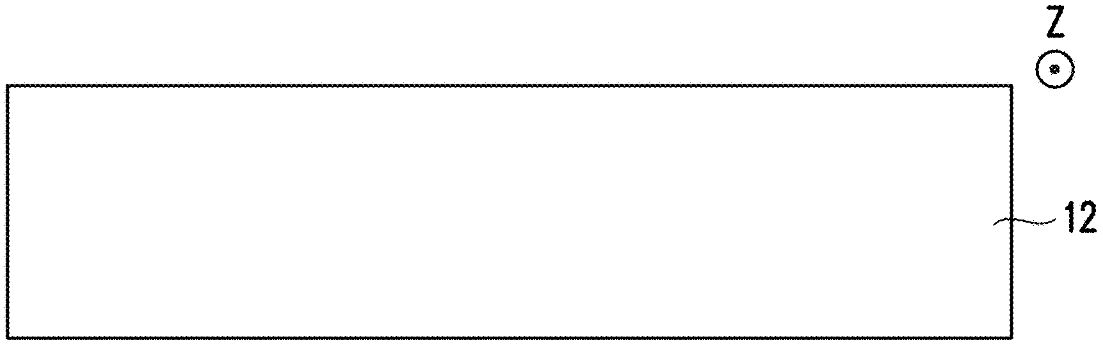
FIG. 11A to FIG. 11C are respectively top schematic views of multiple elements in a decoration device according to an embodiment of the disclosure.
Figure 11B:
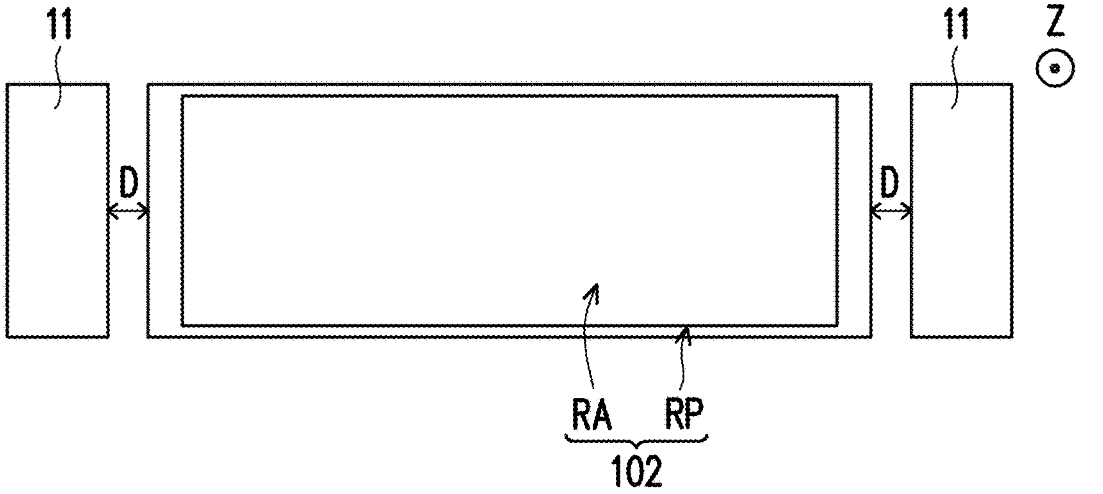
Figure 11C:
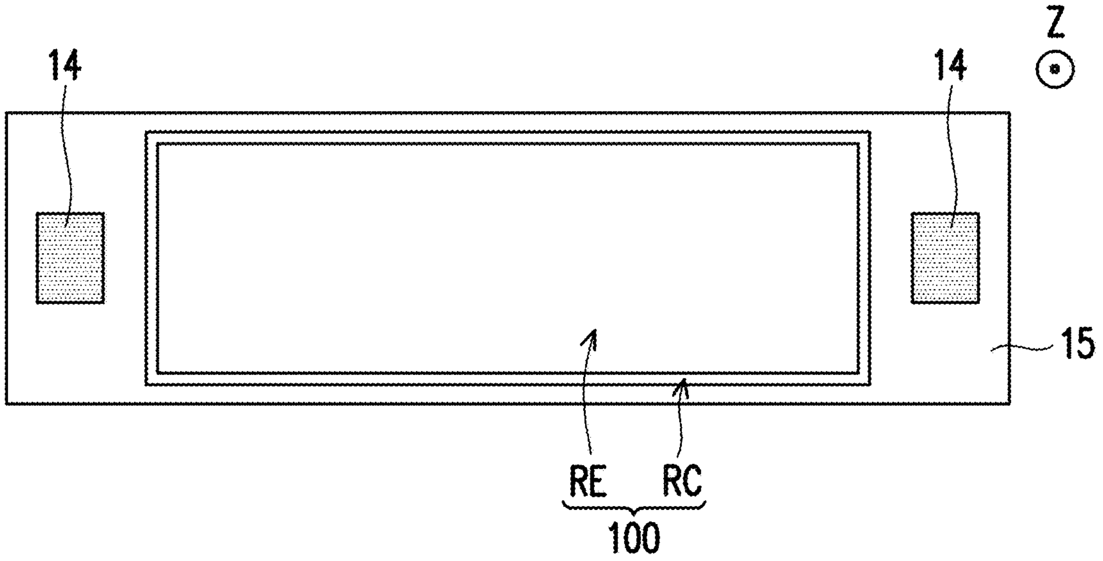

FIG. 11A to FIG. 11C are respectively top schematic views of multiple elements in a decoration device according to an embodiment of the disclosure, which may correspond to the implementations of FIG. 2 and FIG. 4. Please refer to FIG. 11A to FIG. 11C. The non-self-luminous display panel 102 may include an active region RA and a peripheral region RP disposed adjacent to the active region RA. The active region RA is, for example, a region where a pixel array (not shown) is located to provide the variable image VI as shown in FIG. 1B. The peripheral region RP may be disposed on one or more sides of the active region RA and may be used to dispose a peripheral circuit (not shown). In some embodiments, the first region of the decoration device may be defined by the active region RA, and the region other than the first region in the decoration device is the second region.

In some embodiments, the decoration device may include two light emitting modules 11, the two light emitting modules 11 may overlap with the fixed pattern FP (refer to FIG. 1B or FIG. 1C) of the decoration film 12 in the direction Z, and the non-self-luminous display panel 102 may be disposed between the two light emitting modules 11. In some embodiments, a distance D is maintained between the light emitting module 11 and the non-self-luminous display panel 102 to improve the display quality or reduce the light interference. In some embodiments, although not shown in FIG. 11B, a light shielding element may be disposed between the light emitting module 11 and the non-self-luminous display panel 102 to improve the display quality or reduce the light interference.

The backlight module 100 may include a light emitting region RE and a circuit element region RC disposed adjacent to the light emitting region RE. The light emitting region RE is, for example, the largest rectangular region surrounded by a light emitting element array. The light emitting region RE at least partially overlaps with the active region RA in the direction Z. For example, the area of the light emitting region RE may be smaller than or larger than the area of the active region RA. The circuit element region RC may be disposed on one or more sides of the light emitting region RE and may be used to dispose a peripheral circuit (not shown).

In some embodiments, the decoration device may include two tactile feedback modules 14, and the backlight module 100 may be disposed between the two tactile feedback modules 14. The two tactile feedback modules 14 are respectively disposed corresponding to the two light emitting modules 11. For example, the two tactile feedback modules 14 respectively overlap with the two light emitting modules 11 in the direction Z.

In some embodiments, although not shown in FIG. 11A to FIG. 11C, the decoration device may optionally include the viewing angle switching module 16 shown in FIG. 4, and the viewing angle switching module 16 is disposed between the non-self-luminous display panel 102 and the decoration film 12.

In some embodiments, although not shown in FIG. 11A to FIG. 11C, the decoration device may include the touch module 13 disposed corresponding to the second region R2 as shown in FIG. 2. In some embodiments, although not shown in FIG. 11A to FIG. 11C, the non-self-luminous display panel 102 may be integrated with the touch module (disposed corresponding to the first region), so that the non-self-luminous display panel 102 can provide the display function and the touch function. In some embodiments, the touch module disposed corresponding to the first region and the touch module 13 disposed corresponding to the second region R2 may be separated from each other. In some other embodiments, the touch module disposed corresponding to the first region and the touch module 13 disposed corresponding to the second region R2 may be integrated together.

In some embodiments, although not shown in FIG. 11A to FIG. 11C, the backlight module 100 may include at least one optical film, such as a diffusion film and a prism film, but not limited thereto. In some embodiments, the at least one optical film may overlap with the light emitting region RE and the circuit element region RC but not overlap with the two tactile feedback modules 14. In other embodiments, the at least one optical film may overlap with the light emitting region RE, the circuit element region RC, and the two tactile feedback modules 14.

Figure 12A:
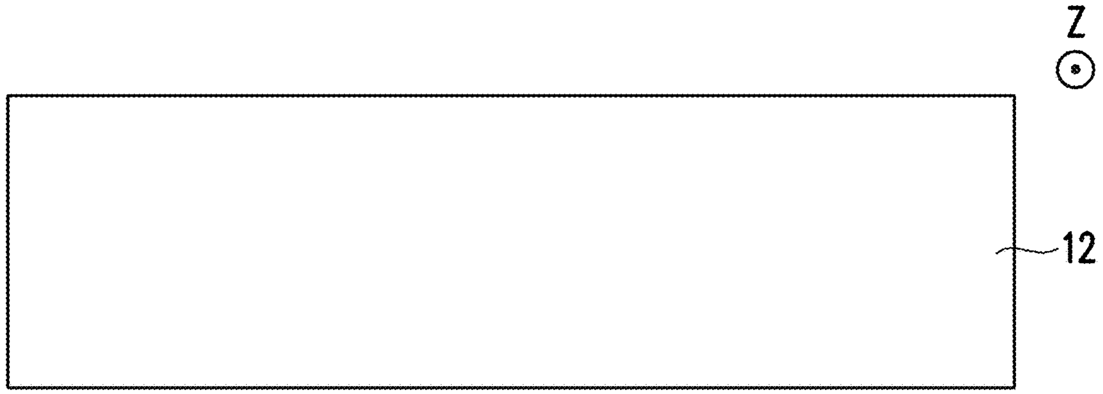
FIG. 12A to FIG. 12C are respectively top schematic views of multiple elements in a decoration device according to another embodiment of the disclosure.
Figure 12B:
Figure 12C:
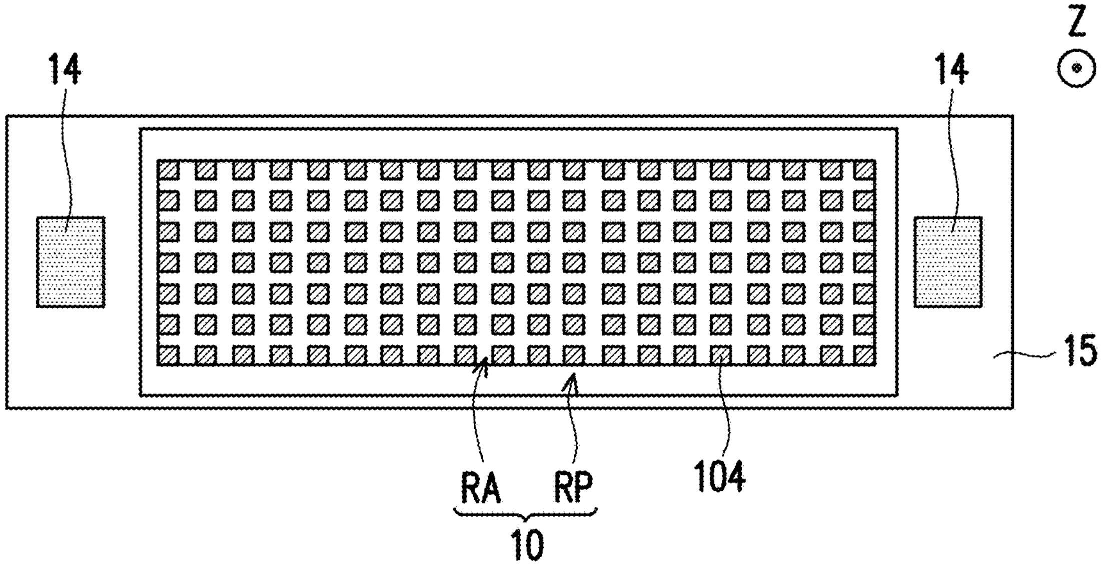

FIG. 12A to FIG. 12C are respectively top schematic views of multiple elements in a decoration device according to another embodiment of the disclosure, which may correspond to the implementations of FIG. 2 and FIG. 5. Please refer to FIG. 12A to FIG. 12C. The display 10 is, for example, a self-luminous display and includes multiple light emitting elements 104. The light emitting elements 104 are arranged in an array. The display 10 includes the active region RA and the peripheral region RP disposed adjacent to the active region RA. The active region RA is, for example, defined by the largest rectangle surrounded by the light emitting elements 104. The peripheral region RP may be disposed on one or more sides of the active region RA and may be used to dispose a peripheral circuit (not shown). In some embodiments, the first region of the decoration device may be defined by the active region RA, and the region other than the first region in the decoration device is the second region.

In some embodiments, the decoration device may include two light emitting modules 11 and two tactile feedback modules 14, and the display 10 may be disposed between the two tactile feedback modules 14. The two tactile feedback modules 14 are respectively disposed corresponding to the two light emitting modules 11. For example, the two tactile feedback modules 14 respectively overlap with the two light emitting modules 11 in the direction Z.

Through the design of disposing the light emitting elements 104 of the display 10 and the light emitting elements (not shown in FIG. 12B) of the light emitting module 11 on different layers, the display quality can be improved or the light interference can be reduced, and the light shielding element may be omitted.

In some embodiments, although not shown in FIG. 12A to FIG. 12C, the decoration device may optionally include the viewing angle switching module 16 shown in FIG. 4, and the viewing angle switching module 16 is disposed between the display 10 and the decoration film 12.

In some embodiments, although not shown in FIG. 12A to FIG. 12C, the decoration device may include the touch module 13 disposed corresponding to the second region R2 as shown in FIG. 2. In some embodiments, although not shown in FIG. 12A to FIG. 12C, the display 10 may be integrated with the touch module (disposed corresponding to the first region), so that the display 10 can provide the display function and the touch function. In some embodiments, the touch module disposed corresponding to the first region and the touch module 13 disposed corresponding to the second region R2 may be separated from each other. In some other embodiments, the touch module disposed corresponding to the first region and the touch module 13 disposed corresponding to the second region R2 may be integrated together.

Figure 13A:
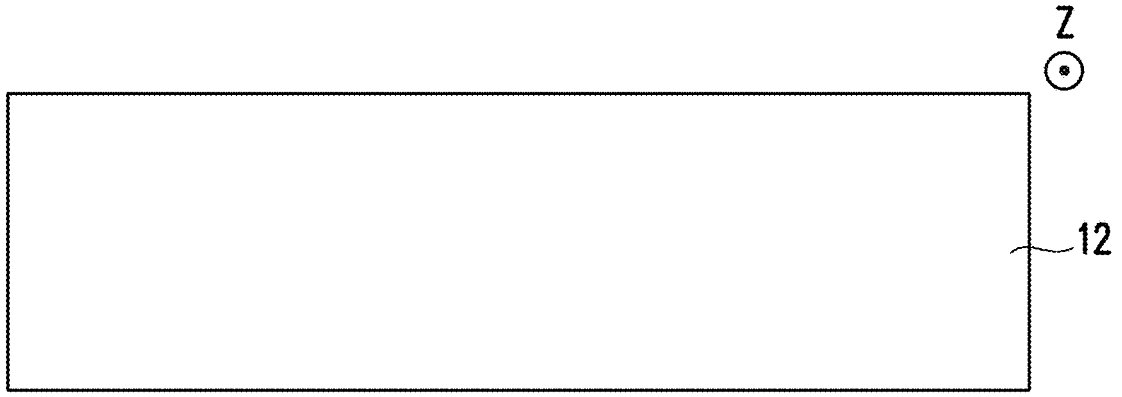
FIG. 13A to FIG. 13C are respectively top schematic views of multiple elements in a decoration device according to yet another embodiment of the disclosure.
Figure 13B:
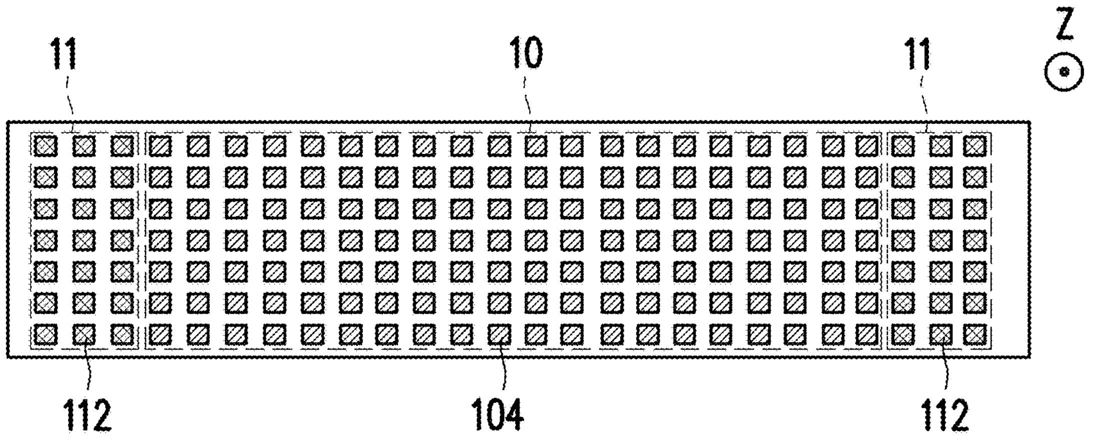
Figure 13C:
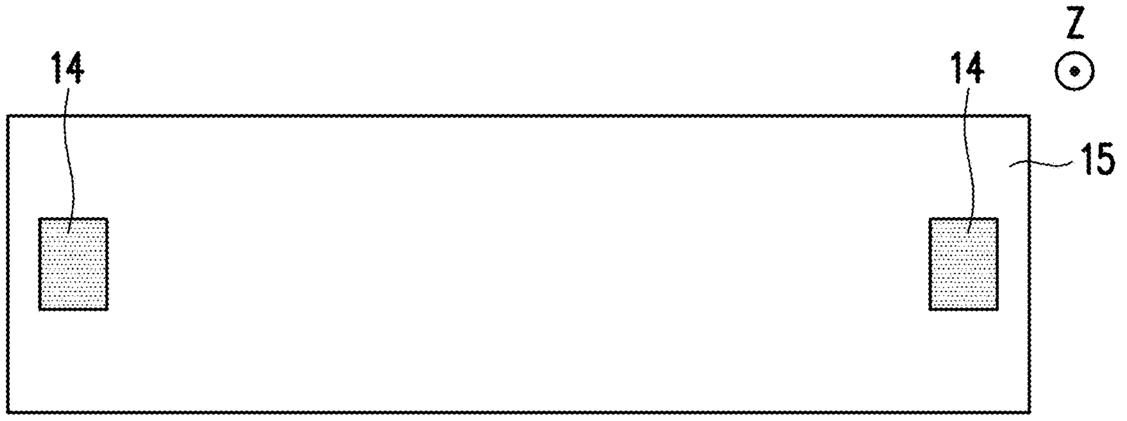

FIG. 13A to FIG. 13C are respectively top schematic views of multiple elements in a decoration device according to yet another embodiment of the disclosure, which may correspond to the implementations of FIG. 2 and FIG. 5. Please refer to FIG. 13A to FIG. 13C. The main difference between this embodiment and the embodiment shown in FIG. 12A to FIG. 12C is that the display 10 and the two light emitting modules 11 are integrated together.

In some embodiments, although not shown in FIG. 13A to FIG. 13C, the density of the light emitting elements 104 in the display 10 may be different from the density of the light emitting elements 112 in the light emitting module 11. In some embodiments, although not shown in FIG. 13A to FIG. 13C, the size of the light emitting elements 104 in the display 10 may be different from the size of the light emitting elements 112 in the light emitting module 11.

In some embodiments, the light beams output by the light emitting elements 104 in the display 10 may vary in brightness and/or color according to requirements. For example, the light emitting elements 104 may include multiple red light emitting diodes, multiple green light emitting diodes, and multiple blue light emitting diodes, but not limited thereto. In some embodiments, the light beams output by the light emitting elements 112 in the light emitting module 11 may vary in brightness and/or color according to requirements (for example, when the light emitting element 112 adopts a colored light emitting element, the decoration film 12 may be omit the color defining layer). Alternatively, the light beams output by the light emitting elements 112 in the light emitting module 11 may vary in brightness without color variation (for example, when the light emitting element 112 adopts a monochromatic light emitting element, the decoration film 12 may include the color defining layer, so that the color presented by the fixed pattern is different from the color of the light beam emitted by the light emitting element 112).

In some embodiments, although not shown in FIG. 13A to FIG. 13C, the decoration device may optionally include the viewing angle switching module 16 shown in FIG. 4, and the viewing angle switching module 16 is disposed between the display 10 and the decoration film 12.

In some embodiments, although not shown in FIG. 13A to FIG. 13C, the decoration device may include the touch module 13 disposed corresponding to the second region R2 as shown in FIG. 2. In some embodiments, although not shown in FIG. 13A to FIG. 13C, the display 10 may be integrated with the touch module (disposed corresponding to the first region), so that the display 10 can provide the display function and the touch function. In some embodiments, the touch module disposed corresponding to the first region and the touch module 13 disposed corresponding to the second region R2 may be separated from each other. In some other embodiments, the touch module disposed corresponding to the first region and the touch module 13 disposed corresponding to the second region R2 may be integrated together.

In some embodiments, although not shown in FIG. 13A to FIG. 13C, the decoration device may include an optical film or a filter film disposed on the light emitting elements 104.

In some embodiments, the optical film or the filter film may overlap with the display 10 and not overlap with the two light emitting modules 11.

In some embodiments, although not shown, the decoration device shown in FIG. 13A to FIG. 13C may omit the decoration film 12 and may provide the tactile effect on an outer surface of the display 10 and the two light emitting modules 11 through surface treatment (for example, electroplating, spraying, etching, etc.), but not limited thereto.

In summary, in the embodiment of the disclosure, displaying the variable image and the fixed pattern through divided regions can improve screen clutter, and the variable image does not need to be interrupted to display the fixed pattern. In addition, the decoration film may also be used to provide the decoration function.

The above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

Although the embodiments and the advantages of the disclosure have been disclosed above, it should be understood that any person skilled in the art may make changes, substitutions, and modifications without departing from the spirit and scope of the disclosure, and the features of the embodiments may be arbitrarily mixed and replaced to form other new embodiments. In addition, the protection scope of the disclosure is not limited to processes, machines, manufactures, material compositions, devices, methods, and steps in the specific embodiments described in the specification. Any person skilled in the art may understand conventional or future-developed processes, machines, manufactures, material compositions, devices, methods, and steps from the content of the disclosure as long as the same may implement substantially the same functions or obtain substantially the same results as the embodiments described herein when used according to the disclosure. Therefore, the protection scope of the disclosure includes the above processes, machines, manufactures, material compositions, devices, methods, and steps. In addition, each claim constitutes a separate embodiment, and the protection scope of the disclosure also includes combinations of the claims and the embodiments. The protection scope of the disclosure should be defined by the appended claims.

What is claimed is:

1. A decoration device, comprising a first region and a second region disposed adjacent to the first region, the decoration device comprising:
- a display, disposed corresponding to the first region and used to display a variable image;
- a light emitting module, disposed in the second region and used to emit a light beam to present a fixed pattern;
- a decoration film, disposed at least corresponding to the second region; and
- a tactile feedback module, disposed under the light emitting module,
- wherein the decoration device displays a decoration film surface in a first state, and the decoration device displays the variable image and the fixed pattern in a second state.

2. The decoration device according to claim 1, wherein the decoration film is also disposed corresponding to the first region,
- wherein when the decoration device is in the first state, the first region and the second region both display the decoration film surface, and when the decoration device is in the second state, the first region displays the variable image and the second region displays the fixed pattern.

3. The decoration device according to claim 2, wherein when the decoration device is in a third state, the first region displays the decoration film surface and the second region displays the fixed pattern.

4. The decoration device according to claim 1, wherein the decoration film is disposed outside the first region,
- wherein when the decoration device is in the first state, the first region displays the variable image and the second region displays the decoration film surface, and when the decoration device is in the second state, the first region displays the variable image and the second region displays the fixed pattern.

5. The decoration device according to claim 1, wherein a light transmittance of the decoration film is greater than 50%.

6. The decoration device according to claim 1, wherein a haze of the decoration film is less than 30%.

7. The decoration device according to claim 1, wherein a thickness of the decoration film is greater than 0 mm and less than or equal to 4 mm.

8. The decoration device according to claim 1, wherein the decoration film is an insulating film.

9. The decoration device according to claim 1, wherein the decoration film comprises a protective layer and a pattern defining layer, and the pattern defining layer is used to provide the fixed pattern and is disposed between the light emitting module and the protective layer.

10. The decoration device according to claim 9, wherein the protective layer is transparent.

11. The decoration device according to claim 9, wherein a surface of the protective layer away from the pattern defining layer has unevenness or roughness.

12. The decoration device according to claim 9, wherein the pattern defining layer has a through hole allowing the light beam emitted by the light emitting module to pass through, the decoration film further comprises a color defining layer, and the color defining layer at least overlaps with the through hole.

13. The decoration device according to claim 12, wherein a peel strength of the pattern defining layer and the color defining layer is greater than 30 N/5 cm.

14. The decoration device according to claim 12, wherein a temperature tolerance of the pattern defining layer and the color defining layer is −45 degrees Celsius to 90 degrees Celsius.

15. The decoration device according to claim 1, further comprising:
- a detection module, at least used to detect a hand gesture or a line of sight of a user; and
- a touch module, disposed between the decoration film and the light emitting module and used to execute at least one of a floating touch and a physical touch.

16. The decoration device according to claim 1, further comprising:
- a viewing angle switching module, disposed between the light emitting module and the decoration film.

17. The decoration device according to claim 1, wherein the display comprises a backlight module and a non-self-luminous display panel, the decoration device comprises two of the light emitting modules, and the non-self-luminous display panel is disposed between the two light emitting modules and is located between the decoration film and the backlight module.

18. The decoration device according to claim 17, wherein a distance is maintained between each of the two light emitting modules and the non-self-luminous display panel.

19. The decoration device according to claim 17, wherein a light shielding element is disposed between each of the two light emitting modules and the non-self-luminous display panel.

* * * * *